(12) United States Patent
Garthwaite et al.

(10) Patent No.: US 7,882,505 B2
(45) Date of Patent: Feb. 1, 2011

(54) METHOD AND APPARATUS FOR SWITCHING BETWEEN PER-THREAD AND PER-PROCESSOR RESOURCE POOLS IN MULTI-THREADED PROGRAMS

(75) Inventors: Alexander Garthwaite, Beverly, MA (US); David Dice, Foxboro, MA (US); Derek R. White, Lexington, MA (US)

(73) Assignee: Oracle America, Inc., Redwood City, CA (US)

( * ) Notice: Subject to any disclaimer, the term of this patent is extended or adjusted under 35 U.S.C. 154(b) by 1713 days.

(21) Appl. No.: 11/090,398

(22) Filed: Mar. 25, 2005

(65) Prior Publication Data

US 2006/0218557 A1    Sep. 28, 2006

(51) Int. Cl.
  G06F 9/46    (2006.01)
  G06F 13/00   (2006.01)

(52) U.S. Cl. .................. 718/104; 718/102; 711/173

(58) Field of Classification Search ........... 718/100, 718/102, 104; 711/173
See application file for complete search history.

(56) References Cited

U.S. PATENT DOCUMENTS

| | | | |
|---|---|---|---|
| 5,590,332 A * | 12/1996 | Baker ..................... | 717/151 |
| 5,761,091 A * | 6/1998 | Agrawal et al. ........... | 702/186 |
| 5,920,876 A | 7/1999 | Ungar et al. | |
| 6,115,782 A | 9/2000 | Wolczko et al. | |
| 6,148,310 A | 11/2000 | Azagury et al. | |
| 6,173,294 B1 | 1/2001 | Azagury et al. | |
| 6,185,581 B1 | 2/2001 | Garthwaite | |
| 6,226,653 B1 | 5/2001 | Alpern et al. | |
| 6,243,720 B1 | 6/2001 | Munter et al. | |
| 6,308,185 B1 | 10/2001 | Grarup et al. | |
| 6,341,347 B1 * | 1/2002 | Joy et al. ............... | 712/228 |
| 6,363,403 B1 | 3/2002 | Roy et al. | |
| 6,381,738 B1 | 4/2002 | Choi et al. | |
| 6,424,977 B1 | 7/2002 | Garthwaite | |
| 6,430,580 B1 * | 8/2002 | Azagury et al. ............ | 1/1 |
| 6,453,466 B1 | 9/2002 | Eidt et al. | |
| 6,457,019 B1 | 9/2002 | Sexton et al. | |
| 6,487,578 B2 * | 11/2002 | Ranganathan ............ | 718/104 |
| 6,490,599 B2 | 12/2002 | Kolodner et al. | |

(Continued)

OTHER PUBLICATIONS

Appel, "Simple Generational Garbage Collection and Fast Allocation", Software Practice and Experience, 19(2), 1989, 171-183.

(Continued)

*Primary Examiner*—Chat C Do
*Assistant Examiner*—Caroline Arcos
(74) *Attorney, Agent, or Firm*—Osha • Liang LLP

(57) ABSTRACT

In a multi-processor multi-threaded computer system, resources are dynamically assigned during program operation to either threads or processors in such a manner that resource usage is maximized. In one embodiment, the choice of whether to assign resources to threads or processors is dependent on the number of threads versus the number of processors. In another embodiment, when the system is operating in one assignment mode, the amount of wasted resources is measured and when this measured amount exceeds a predetermined threshold based on the maximum resources that could be wasted were the system operating in the other assignment mode, the assignment is switched to the other assignment mode.

25 Claims, 8 Drawing Sheets

U.S. PATENT DOCUMENTS

| | | | |
|---|---|---|---|
| 6,542,911 | B2* | 4/2003 | Chakraborty et al. ............... 1/1 |
| 6,549,930 | B1* | 4/2003 | Chrysos et al. ............. 718/104 |
| 6,694,347 | B2* | 2/2004 | Joy et al. ..................... 718/108 |
| 6,799,236 | B1* | 9/2004 | Dice et al. .................. 710/200 |
| 6,826,583 | B1* | 11/2004 | Flood et al. ......................... 1/1 |
| 6,826,757 | B2 | 11/2004 | Steele et al. |
| 6,845,437 | B2* | 1/2005 | Borman et al. .............. 711/173 |
| 6,868,488 | B2 | 3/2005 | Garthwaite |
| 7,069,281 | B2* | 6/2006 | Garthwaite ......................... 1/1 |
| 7,185,167 | B2* | 2/2007 | Sollich ........................ 711/173 |
| 7,240,169 | B2* | 7/2007 | Dennie ........................ 711/153 |
| 7,310,718 | B1* | 12/2007 | Liang et al. .................. 711/170 |
| 7,320,065 | B2* | 1/2008 | Gosior et al. ............... 712/227 |
| 7,624,395 | B2* | 11/2009 | Dostert .......................... 718/1 |
| 7,636,918 | B2* | 12/2009 | Kadashevich ............... 718/105 |
| 7,665,090 | B1* | 2/2010 | Tormasov et al. ........... 718/104 |
| 2002/0157086 | A1* | 10/2002 | Lewis et al. .................. 717/127 |
| 2004/0003014 | A1 | 1/2004 | Nagarajan et al. |
| 2004/0172507 | A1* | 9/2004 | Garthwaite ................. 711/159 |
| 2005/0066302 | A1* | 3/2005 | Kanade ....................... 717/100 |
| 2005/0198088 | A1* | 9/2005 | Subramoney et al. ....... 707/206 |
| 2006/0150190 | A1* | 7/2006 | Gusler et al. ................. 718/105 |
| 2006/0173877 | A1* | 8/2006 | Findeisen et al. ........... 707/101 |

OTHER PUBLICATIONS

Appel, et al., "Real-Time Concurrent Collection on Stock Multiprocessors", ACM SIGPLAN Notices, 1988.

Bacon, et al., "Java without the Coffee Breaks: A nonintrusive Multiprocessor Garbage Collector", SIGPLAN Conference on Programming Language Design and Implementation, Jun. 2001, Snowbird, UT.

Baker, "List Processing in Real Time on a Serial Computer", Communications of the ACM 21, Apr. 1978, 280-294.

Brooks, "Trading Data Space for Reduced Time and Code Space in Real-Time Garbage Collection on Stock Hardware", Proceedings of the 1984 Acm Symposium on Lisp and Funcional Programming, Aug. 1984, 108-113, Austin, TX.

Chilimbi, et al., "Using Generational Garbage Collection to Implement Cache-Conscious Data Placement", International Symposium on Memory Management, Oct. 1998.

Clark, et al., "Compacting Garbage Collection can be Fast and Simple", Software-Practice and Experience, vol. 26, No. 2, Feb. 1996, 177-194.

Courts, "Improving Locality of Reference in a Garbage-Collecting Memory Management System", Communications of the ACM, vol. 31, No. 9, Sep. 1988, 1128-1138.

Grarup, et al., "Incremental Mature Garbage Collection", M. Sc. Thesis @ http://www.daimi.aau.dk/jacobse/Papers, Aug. 1993.

Herlihy, et al., "Lock-Free Garbage Collection for Multiprocessors", ACM SPAA, 1991, 229-236.

Holzle, Urs, "A Fast Write Barrier for Generational Garbage Collectors", Workshop on Garbage Collection in Object Oriented Systems, Oct. 1993.

Hosking, et al., "Remembered Sets Can Also Play Cards", OOPSLA/ECOOP Workshop on Garbage Collection in Object-Oriented Systems, Oct. 1993.

Hosking, et al., "Protection Traps and Alternatives for Memory Management of an Object-Oriented Language", Object Systems Laboratory, Dec. 1993, 1-14, Dept. of Comp. Sci., Amherst, MA.

Hudson, et al., "Incremental Collection of Mature Objects", Proceedings of the Int'l Workshop on Memory Managment, 1992, pp. 1-16, Springer-Verlag.

Hudson, et al., "Adaptive Garbage Collection for Modula-3 and Small Talk", OOPSLA.ECOOP '90 Workshop on Garbage Collection in Object-Oriented Systems, Oct. 27, 1990.

Hudson, et al., "Sapphire: Copying GC Without Stopping the World", Java Grande/ISCOPE, 2001.

Jones and Lins, "Garbage Collection: Algorithms for Automatic Dynamic Memory Management", 1996, 165-179, John Wiley and Sons, NY.

Lieberman, et al., "A Real-Time Garbage Collector Based on the Lifetimes of Objects", Communications of the ACM, 1983, 26(6).

Moon, "Garbage Collection in a Large Lisp System", Conference Record of the 1984 ACM Symposium on LISP and Functional Programming, Aug. 1984, 235-246, Austin, TX.

Nettles, Scott, "Real-Time Replication Garbage Collection", Avionics Lab, Wright Research and Development Center, 1993, PDDI.

Seligmann, et al., "Incremental Mature Garbage Collection, In the European Conference on Object-Oriented Programming", M.Sc. Thesis @ http://www.daimi.aau.dk/jacobse/Papers/, 1995.

Sobalvarro, "A Lifetime-based Garbage Collector for LISP Systems on General-Purpose Computers", Department of Electrical Engineering and Computer Science at MIT, Sep. 1988, AITR-1417.

Stamos, "Static Grouping of Small Objects to Enhance Performance of a Paged Virtual Memory", ACM Transactions on Computer Systems, vol. 2, No. 2, May 1984, 155-180.

Ungar, "Generation Scavenging: A Non-Disruptive High Performance Storage Reclamation Algorithm", ACM SIGPLAN Notices, Apr. 1984, 19(5).

Wilson, "Uniprocessor Garbage Collection Techniques", Technical Report, University of Texas, 1994.

Withington, P.T., "How Real is "Real-Time" GC?", Symbolics, Inc., Oct. 6, 1991, Burlington, MA.

Zorn, Benjamin, "Barrier Methods for Garbage Collection", Dept. of Computer Science, Uni. of Colorado, Nov. 1990, 1-37, Boulder.

Hosking, et al., "A Comparative Performance Evaluation of Write Barrier Implementations", OOPSLA; ACM Conference on Object-Oriented Systems, Languages and Applications, Oct. 1992, V. 27(10), ACM Press, Vancouver, Canada.

Lam, et al., "Object Type Directed Garbage Collection to Improve Locality", Proceedings of the International Workshop on Memory Management, Sep. 1992, 404-425, St. Malo, France.

Pirinen, Pekka, "Barrier Techniques for Incremental Tracing", Harlequin Limited, 1998, 20-25, Cambridge, Great Britain.

Wilson, et al., "Effective Static-Graph Reorganization to Improve Locality in Garbage Collected Systesm", Proceedings of ACM SIGPLAN Conference on Programming Language Design and Implementation, Jun. 1991, Canada.

Detlefs, et al., "Concurrent Remembered Set Refinement in Generational Garbage Collection", Proceedings of the USENIX Java VM '02 Conference, Aug. 1-2, 2002, 14 pages, San Francisco, CA, USA.

* cited by examiner

METHOD AND APPARATUS FOR SWITCHING BETWEEN PER-THREAD AND PER-PROCESSOR RESOURCE POOLS IN MULTI-THREADED PROGRAMS

BACKGROUND

This invention relates to multiprocessor computer systems and to methods and apparatus for managing shared resources in such systems. One central challenge of implementing scalable multi-threaded programs is efficiently managing shared resources, such as memory. The traditional way to manage shared resources is to use a blocking synchronization operation provided by the operating system, such as a mutex. Blocking synchronization allows one thread at a time to safely operate on a shared-resource, while blocking any other threads that attempt synchronized access to the same resource. However, if the shared resource is frequently used by many threads, the use of blocking synchronization can quickly become a bottleneck. Another solution on uniprocessors is to use kernel-assisted non-blocking synchronization, such as restartable atomic sequences. These schemes do not prevent several threads from starting a transaction for a shared resource at the same time, but they detect contention, and cause interrupted transactions to either roll-forward or roll-back to a consistent state.

One conventional solution to the bottleneck caused by blocking synchronization is to partition the resources among threads into resource "pools", so each thread has a resource pool that is dedicated to that thread. The thread can then access and manipulate its local resource pool without using blocking synchronization because only that thread can access the pool. However, when local resource pools are used, it is important to efficiently partition resources among the pools, so that resources are available to the threads that need them, and not wasted on the threads that do not need them.

Per-thread resource pools work well for many applications, such as those applications that have relatively few threads or whose threads are compute-bound. However, when the number of threads greatly exceeds the number of processors in the multi-processor system, the ability of threads to make use of the pools is diminished as most threads will be suspended for long periods of time with no chance to run. In such cases, the suspended threads may have partially unused resource pools which tie up the resources and the efficiency of pool usage decreases.

Accordingly, another conventional solution is to partition the resources among processors into resource "pools", so each processor has a resource pool that is dedicated to that processor. Using a technique called "multi-processor restartable critical sections", a thread can access a per-processor resource in a critical section. If the thread is preempted while in the critical section, it will be notified when it attempts to complete the transaction, and can retry access to the resource. In this way, multiple threads can safely share a per-process resource without using blocking synchronization. This solution has the advantage that a resource pool is available to any thread running on the processor to which the resource pool is dedicated. Such an arrangement implementing processor local allocation buffers for a garbage collection system is discussed in detail in-an article entitled "Supporting Per-processor Local-allocation Buffers Using Multi-processor Restartable Critical Sections", D. Dice, A. Garthwaite and D. White, available at website: research.sun.com/technical-reports/2004/smli_tr-2004-126.pdf.

However, there are conditions when the use of per-processor resource pools also leads to poor resource utilization. For example, when the number of allocating threads is less than the number of processors, or when threads are entirely compute-bound, threads using resources from processor-dedicated resource pools may be preempted and migrate to other processors, leaving partially-used resource pools tied to idle processors. While the amount of wasted memory with processor-dedicated pools is bounded by the number of processors instead of the number of threads as with thread dedicated pools, it is still a concern.

SUMMARY

In accordance with the principles of the invention, during program operation, resources are dynamically assigned to either threads or processors in such a manner that the resources can be used without accounting for intervening access by other threads and resource usage is maximized.

In one embodiment, the choice of whether to assign resources to threads or processors is dependent on the ratio of the number of threads and the number of processors. The number of threads may be restricted to the number of threads that have been using the resources since the last time that resource usage was measured.

In another embodiment, a threshold is used to determine whether to assign resources to threads or processors. In particular, the amount of wasted resources is measured. When the system is operating in one resource assignment mode, the threshold is determined by calculating the maximum amount of wasted resources that could result if the system were operating in the other resource assignment mode. When the measured amount exceeds the threshold, the assignment mode is switched.

In still another embodiment, the assignment between resources and either threads or processors is switched by patching the resource utilization code. The patch points to pre-existing code that causes the resource utilization code to operate in the other resource assignment mode.

DETAILED DESCRIPTION

In order to simplify the discussion below and as a non-limiting example, per-thread resource assignment and per-processor resource assignment is illustrated with local allocation buffers that are used to allocate heap space to objects without further synchronization. One skilled in the art would realize that the principles of the invention could be applied to other resources as well as memory.

In particular, one of the services of a garbage collector is the allocation of properly initialized memory from the heap. Depending on the collection technique employed, free memory is distinguished from allocated memory either by maintaining the allocated memory in free-lists, such as those typically found in non-moving collectors or by maintaining a free-pointer to a boundary between allocated and free memory. Further, the garbage-collected heap may be organized into several subheaps, each with its own mechanisms for allocating memory. For example, the heap might be organized into sub-heaps for different generations in a generational collector, or into sub-heaps for different types or sizes. Because the memory available for allocation is a shared resource, care must be taken to allow multiple, independent threads to perform allocations concurrently.

One mechanism commonly employed to reduce contention among threads to allocate heap memory is a "local allocation buffer" or LAB. Each thread may be assigned one or more thread-specific LABs (called TLABs) from the heap. Alternatively, each processor may be assigned one or more LABs (called PLABs) from the heap. The use of LABs is managed by metadata associated with each LAB.

Figure 1:
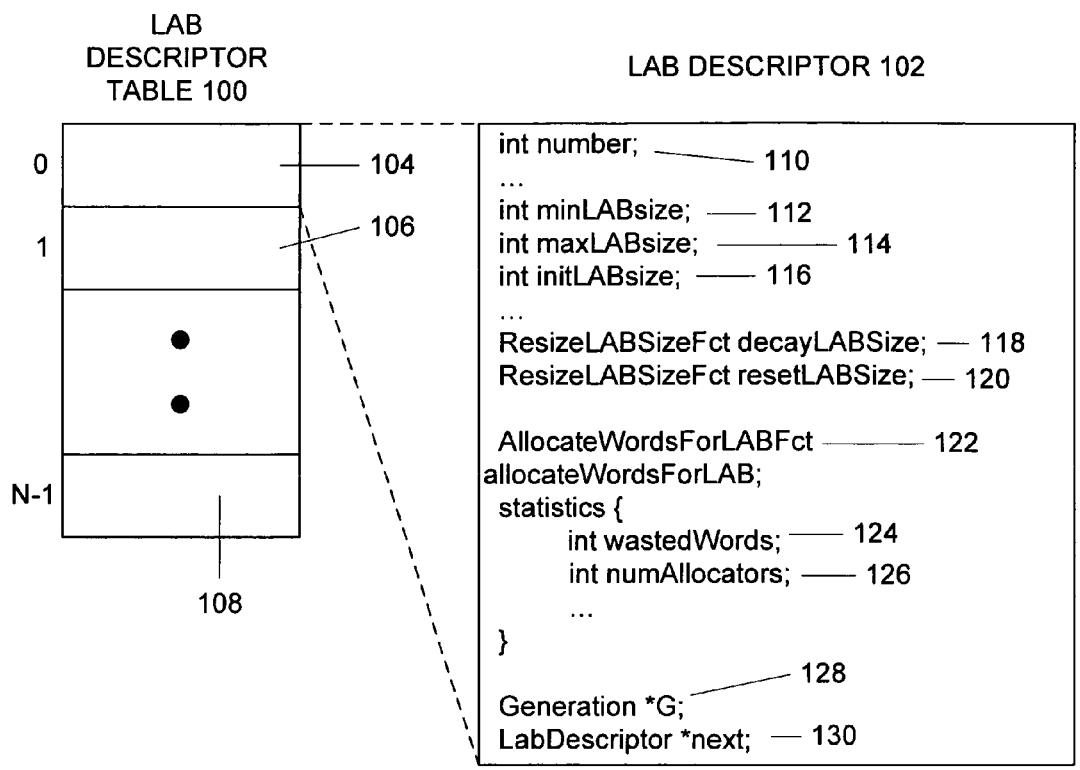
FIG. 1 is a block schematic diagram that shows a local allocation buffer descriptor table and an illustrative entry containing metadata that describes a local allocation buffer.

FIG. 1 shows how the metadata managing the use of LABs is organized. As mentioned above, heap memory may be organized into sub-heaps that correspond, for example, to generations. Each of these generations may, in turn, employ LABs for different purposes, such as controlling the placement of different types of objects. The generations are initialized during the initialization of the heap, and during its initialization, each generation may request zero or more LABs for its use. For each of these requests, the generation specifies properties, such as the minimum and maximum and initial size of a LAB (112, 114 and 116, respectively) and functions for allocating memory for LABs (122) and adjusting the sizing policy (118, 120). These properties comprise a LAB descriptor 102 and are stored in an entry of a LAB descriptor table 100. The index (or identifier) of the entry in the table, hereafter referred to as a LAB number 110, is returned to the generation when the LAB is created. In FIG. 1, entries 104, 106 and 108 with LAB number 0, 1 and n-1 are shown. The LAB number is used to associate TLABs or PLABs with their LAB descriptors. Each LAB descriptor also contains of statistics about LABs sharing the same LAB number as that entry. In FIG. 1, two statistics, including the number of unallocated (wasted) words 124 that remain at the end of a collection cycle and the number of allocators 126 allocating space in the LAB are shown. Other statistics could also be kept. The LAB descriptor 102 also includes a pointer 128 to the generation which requested that it be created and a pointer 130 to the next LAB descriptor if more than one LAB is associated with the generation.

Figure 2:
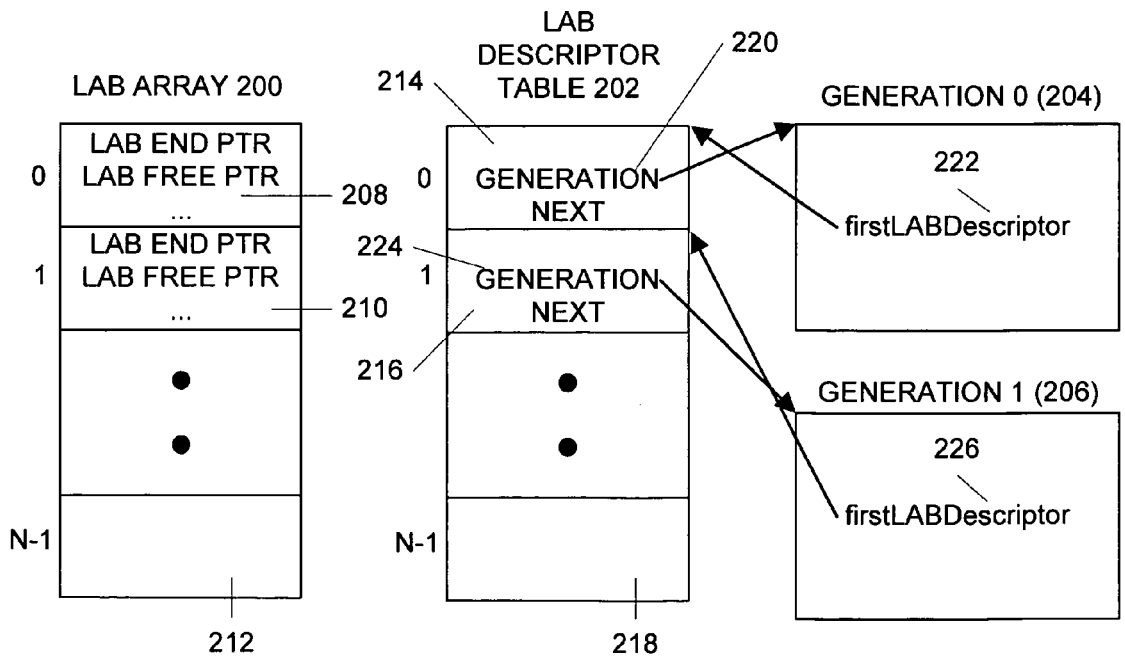
FIG. 2 is a block schematic diagram that shows the relationship between a set of local allocation buffers, the local allocation buffer descriptor table and garbage-collection generations.
Figure 3:
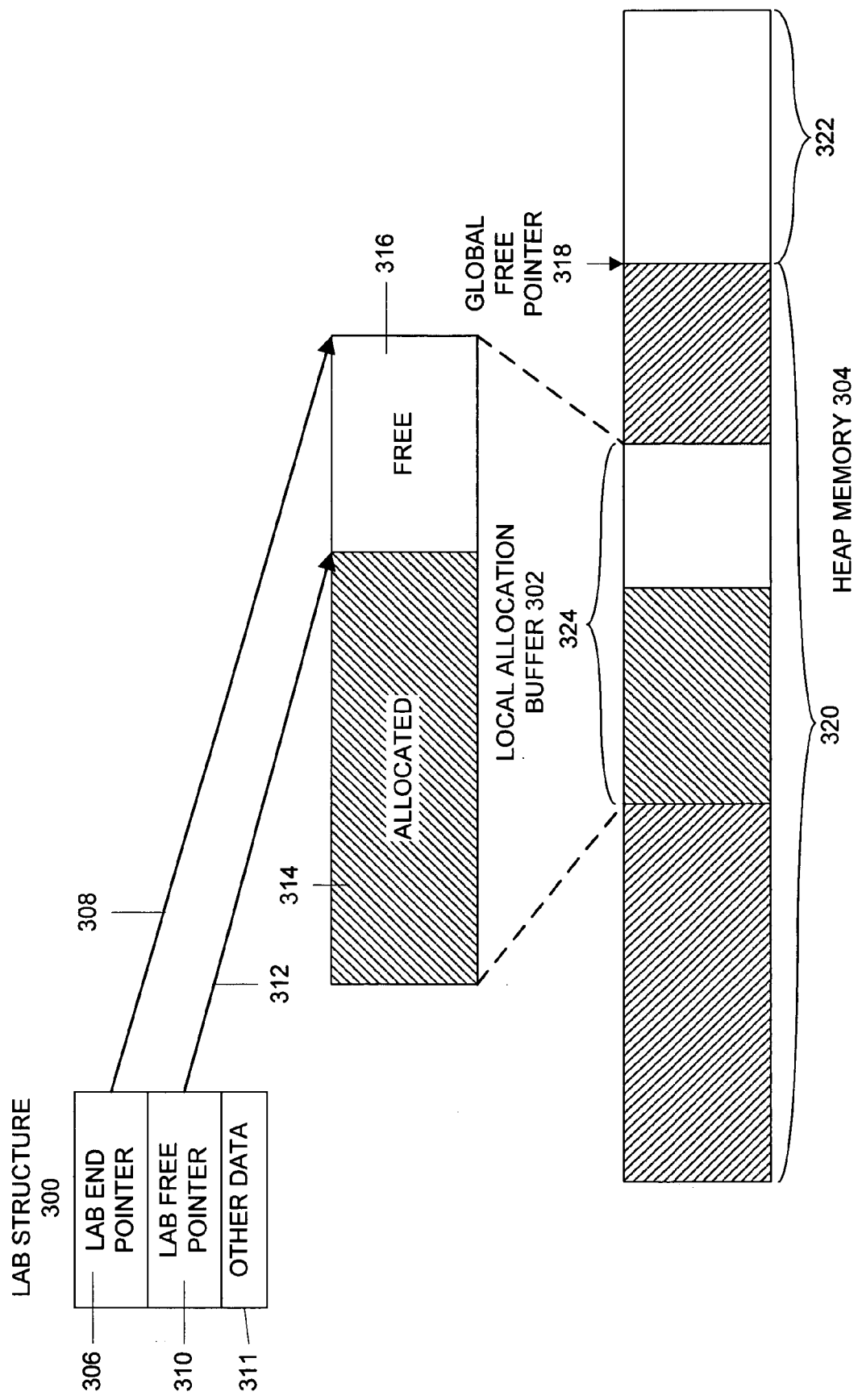
FIG. 3 is a block schematic diagram illustrating, in a garbage-collected system that uses local allocation buffers, the structure of a local allocation buffer and how the buffer is related to heap memory.

FIG. 2 shows the relationship between a set of thread-specific or processor-specific LABs, the LAB descriptor table 202, and the generations 204 and 206 comprising a two-generation heap where each generation uses a single kind of LAB each. As illustrated in FIG. 3 below, the LABs, themselves are defined by a LAB array 200 which contains an entry for each LAB. Although only one LAB array is shown in FIG. 2, there will be one LAB array for each allocating processor or thread, depending on the LAB assignment mode used. Entries 208, 210 and 212 are shown, however, other entries could also be present. Each entry, in turn, has a LAB end pointer and a LAB free pointer that define where in the heap the LAB is located.

In this example, the youngest generation, Generation 0 (204), makes use of LABs with a LAB number of 0 and has initialized the first entry 214, at index 0, in the LAB descriptor table 202 to reflect the policies governing LABs of that index. The entry 214 contains a pointer 220 to generation 0 (204). In addition, generation 0 contains a pointer 222 to the entry 214 in LAB descriptor table 202. Likewise, Generation 1 (206) makes use of LABs with a LAB number of 1 and has initialized the second entry 216, at index 1, in the LAB descriptor table 202 to reflect its policies. The entry 216 contains a pointer 224 to generation 1 (206). In addition, generation 1 contains a pointer 226 to the entry 216 in LAB descriptor table 202.

FIG. 3 is a block schematic diagram illustrating the structure of a partially allocated LAB 302 used in connection with a garbage-collected heap memory 304. This LAB may be either a TLAB or a PLAB. LAB 302 is managed by a LAB array structure 300 that includes two pointers associated with the LAB 302. These pointers are a LAB end pointer 306 and a LAB free pointer 310. The lab free pointer 310 points to the beginning on the free space in the LAB as indicated by arrow 312. The LAB end pointer points to the end of the LAB as indicated by arrow 308. As discussed below, other data 311 describing the LAB may also be included in the LAB structure 300. Although shown as a separate entity 302, the LAB 302 is actually a portion 324 of the allocated part 320 of heap memory 304. When it is created, LAB 324 is allocated by a global allocator that manipulates the global free pointer 318 under control of a global lock to allocate some of the free space 322 of the heap 304 to the LAB 324.

Figure 4:
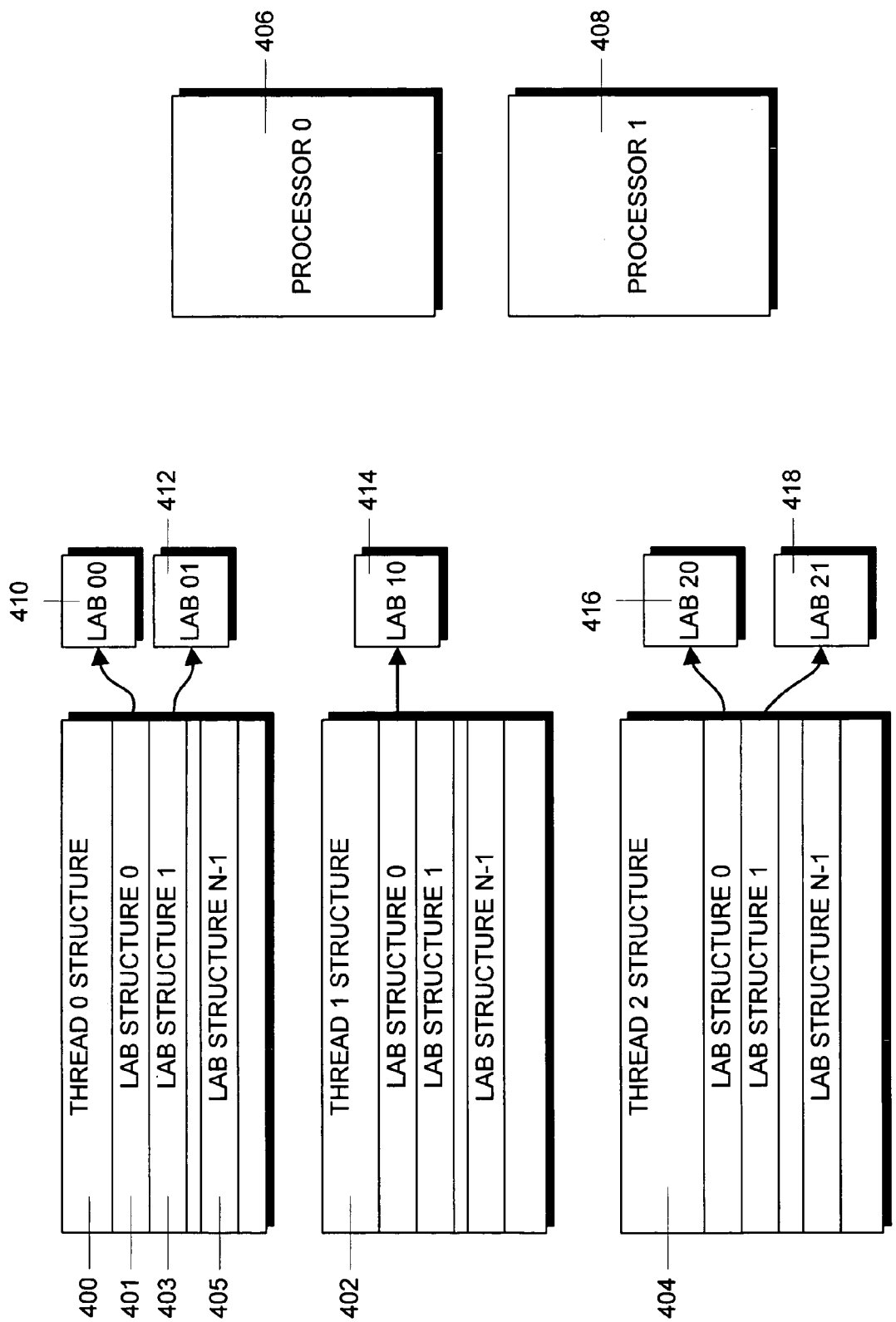
FIG. 4 is a block schematic diagram of an illustrative system with two processors and three threads that uses per-thread resource allocation buffers.

With this arrangement, FIG. 4 shows an illustrative system with three threads 400, 402 and 404 and two processors 406 and 408, using a two generation garbage collector. Thread 400 has two TLABs associated with it, for handling allocations to each sub-heap (each sub-heap corresponds to a generation in this example). Although only two TLABs 410 and 412 are shown, those skilled in the art would realize that each thread might have one or more TLABs associated with it. Each LAB assigned to thread 400 is managed by a LAB structure, such as structure 300 in FIG. 3. The LAB structures for each thread are stored in an array that is indexed by a number assigned to a generation. In FIG. 4, these LAB structures are shown embedded in the actual thread structure. However, it is also possible to place these structures in another location. Each thread, such as thread 400, has an array of LAB structures, of which structures 401-405 are illustrated in FIG. 4. As shown, LAB structure 401 manages LAB 410 and LAB structure 403 manages LAB 412. Other LAB structures, such as structure 405, can be used to manage additional LABs should these be created.

Similarly, thread 402 has a single TLAB 414 assigned to it. As with thread 400, thread 402 contains embedded LAB structures that are used to manage LABs assigned to it. Thread 404 also has two TLABs 416 and 418 assigned to it and also contains embedded LAB structures to manage the assigned LABs. Threads 400, 402 and 404 can run on either of processors 406 or 408, but the TLABs are assigned to the threads and are owned by them.

Local-allocation buffers alleviate contention for allocating memory directly from the heap by reducing the frequency of such allocations. Per-thread local-allocation buffers work well for many applications. For example, applications that have relatively few threads or whose threads are compute-bound, are able to make efficient use of LABs. This efficiency results from the fact that such threads typically allocate most of the memory reserved for local-allocation buffers between any two garbage collections. This behavior remains true for most buffer sizing policies so long as the maximum buffer size remains below a suitable fraction of the generation from which the buffers are allocated. However, when the number of threads greatly exceeds the number of processors, the ability of threads to make use of LABs is diminished as most threads will be suspended for long periods of time with no chance to run. In such cases, as the efficiency of LAB usage decreases, the rate of collection increases, forcing the application to spend more time suspended while garbage collections are performed.

Figure 5:
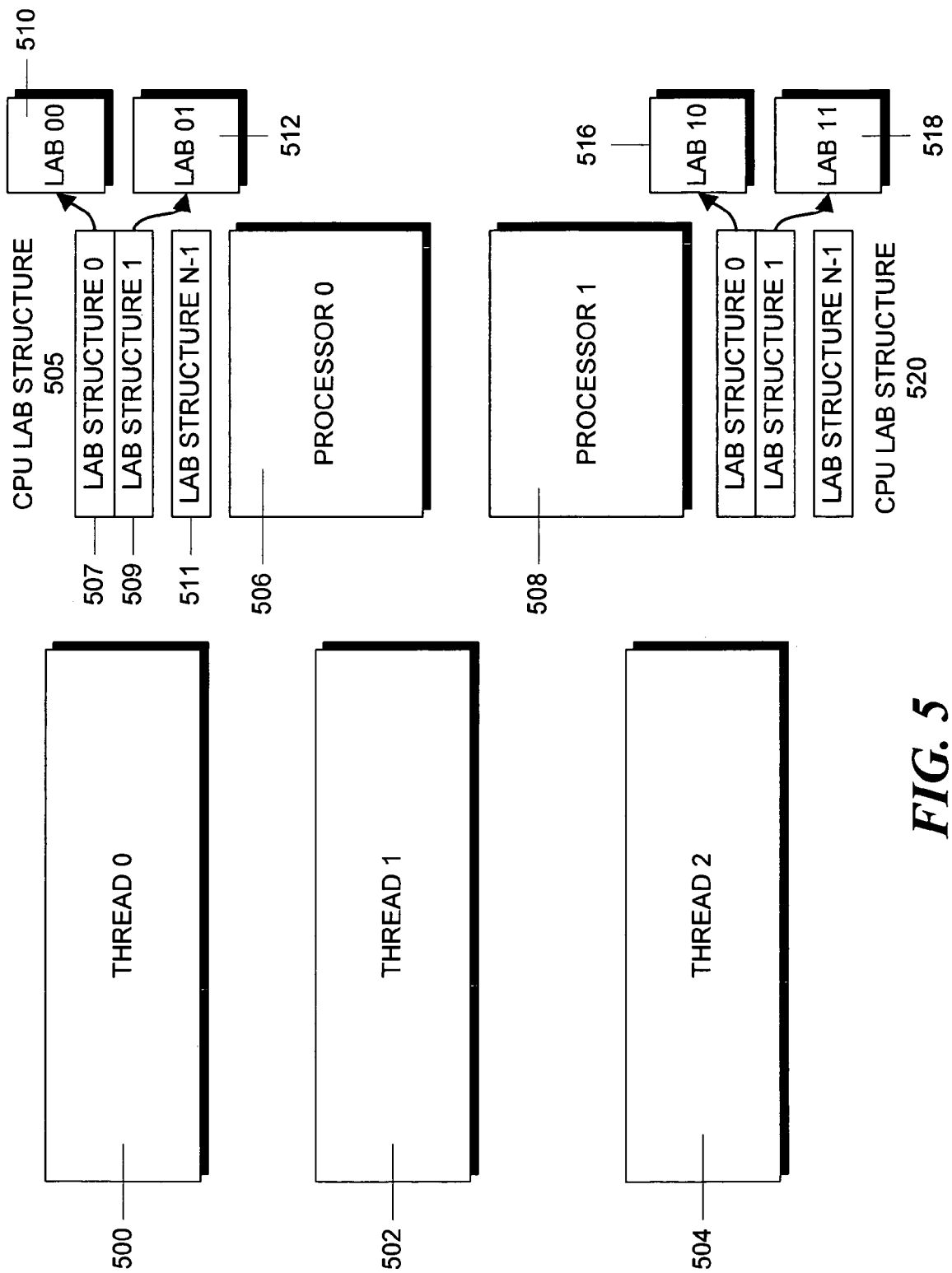
FIG. 5 is a block schematic diagram of an illustrative system with two processors and three threads that uses per-processor resource allocation buffers.

Due to the foregoing problems with the per-thread LABs, for some applications, per-processor LABs (PLABs) provide better efficiency. The PLAB structure is used in a system as illustrated in FIG. 5, which illustrates a garbage-collected system with two generations. Here three threads 500, 502 and 504 run on two processors 506 and 508. However, LABs 510 and 512 are now assigned to processor 506 and are available to any thread running on that processor. Similarly, LABs 516 and 518 are assigned to processor 508 and are available to any thread running on it. The PLABs assigned to a processor are managed by LAB structures (again each similar to structure 300 in FIG. 3) associated with the processor. A global array of such LAB structures can be maintained. This global array is indexed by CPU ID and by LAB number.

In particular, a CPU LAB structure 505 comprising an array of LAB structures is assigned to processor 506. The CPU LAB structure 505 comprises several LAB structures, of which three, 507, 509 and 511 are shown. In particular, since only two generations (sub-heaps) are present each processor may have only two LABs assigned to it no matter how many threads are running in the system. Although only two LABs are required in this example, those skilled in the art would realize that additional LABs could be associated with each processor as necessary. LAB structure 507 manages LAB 510 and LAB structure 509 manages LAB 512. Additional LAB structures, such as structure 511, may be included in order to manage additional LABs. A similar CPU LAB structure 520 is associated with processor 508 in order to manage LABs assigned to that processor.

Although per-processor LABs work well in many circumstances, there are conditions when the use of per-processor resources leads to poor memory utilization. For example, when the number of allocating threads is less than the number of processors, threads allocating from PLABs may be pre-empted and migrate among the processors, leaving partially-used buffers tied to idle processors. While the amount of wasted memory with PLABs is bounded by the number of processors (instead of threads with TLABs), it is still a concern. Therefore, in accordance with the principles of the invention, the assignment of LABs to threads or processors is dynamically switched during the operation of the system so that the assignment that works best for each application is used.

In one embodiment, the assignment is switched based on a comparison of the measured LAB utilization in the current PLAB or TLAB mode with a threshold. The threshold, in turn, is determined by calculating the maximum amount of unallocated LAB memory that would be possible if the mode that is not currently being used were being used.

To continue the example discussed above, suppose that a generational garbage collector is used. During the collection of a particular generation, those LABs whose memory is reclaimed as part of the collection process are examined, and the amount of memory remaining unallocated (or wasted) is recorded in their LAB descriptors. At the end of the collection of that generation, the accumulated statistics on the number of processors, the number of allocating threads, and the amount wasted for each LAB number assigned to the generation are then used to implement a policy that allows dynamically switching the assignment of LABs from threads to processors or back again. Initially, in one embodiment, a mode selector initializes the application so that it begins with all local allocation buffers of a given LAB number assigned to threads (TLABs). Alternatively, the mode selector could begin the application with all local allocation buffers of a given LAB number assigned to processors (PLABs).

Assuming that TLABs are initially used, at periodic intervals, in this example at the end of a garbage collection cycle, the memory utilization of the LABs is monitored. When the memory utilization falls below a predetermined threshold, a mode switcher switches the assignment to begin assigning local allocation buffers to processors (PLABs). For example, in one embodiment, memory utilization is measured based on the amount of memory that remains unused in the TLABs at the end of a garbage collection cycle, the number of processors and the number of threads in the system. The number of threads may be restricted to those threads that have allocated memory since the last measurement. In addition, the number of threads and processors may be determined at the start of an application or may determined as the number of threads and processors in existence at the time that the measurement is made.

Accordingly, when the amount of memory unused in the TLABs exceeds a calculated threshold, the mode switcher switches the assignment to begin assigning local allocation buffers with processors (PLABs). The monitor continues monitoring the unused memory. Should the amount of unused memory exceed another calculated threshold, the mode switcher reverts the assignment back to TLABs.

In general, the threshold values that cause mode switching are heuristic in nature. In another embodiment, these threshold values can be based on the unused memory that could have resulted from using the LAB mode that is not currently being used. For example, if TLAB assignment is being used, then a predetermined threshold value that might be used is the maximum LAB size times the number of processors. In the case where PLAB assignment is being used, the predetermined threshold value might be the maximum LAB size times the number of allocating threads.

Figure 6:
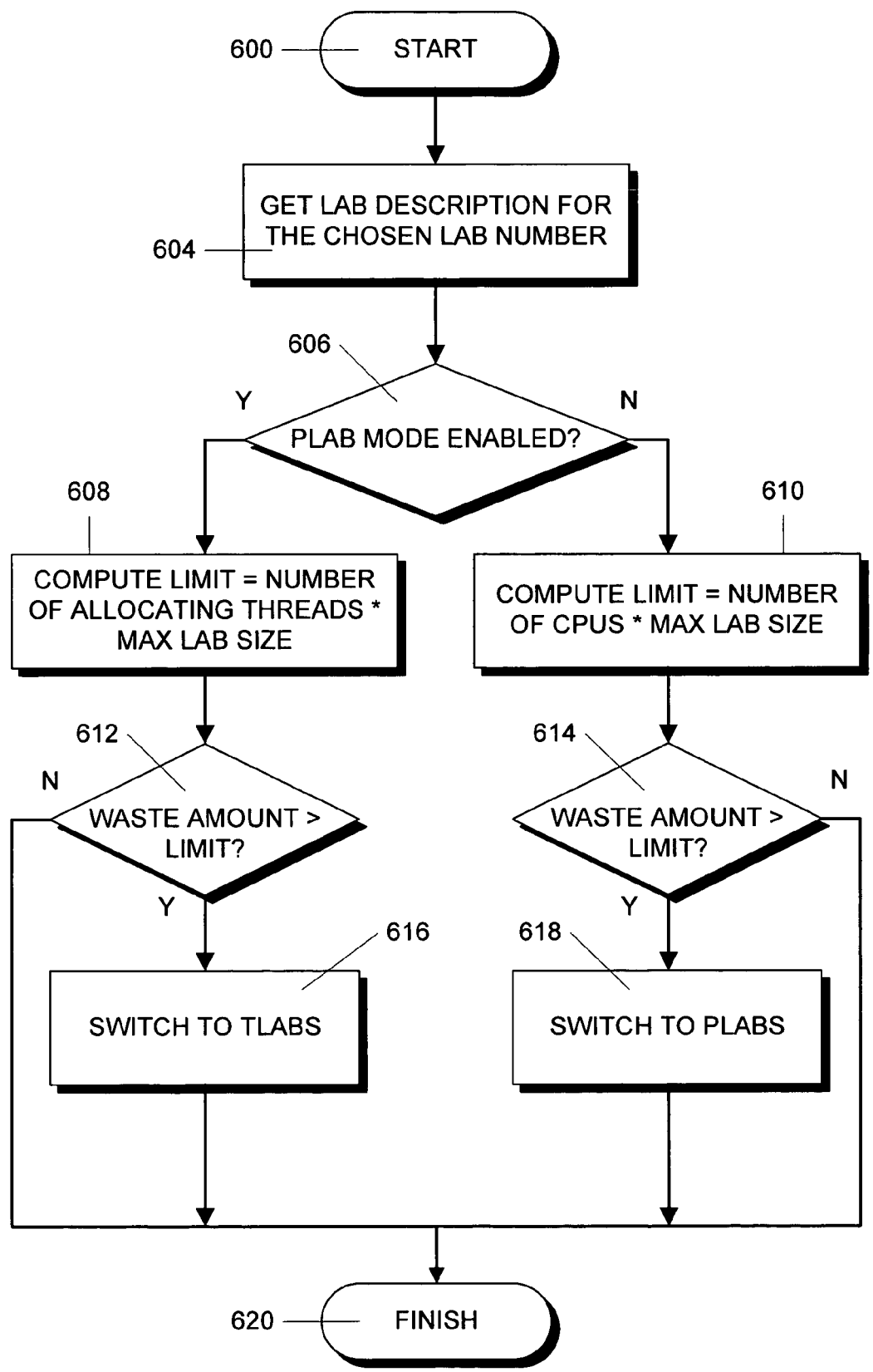
FIG. 6 is a flowchart showing the steps in an illustrative process for switching from per-thread resource assignment to per-processor resource assignment and back again.

The flowchart shown in FIG. 6 illustrates the basic operation. For each of the LAB numbers assigned to the generation that has just been collected, the process starts in step 600. The process then proceeds to step 604, in which LAB description information is retrieved for the current LAB number.

As previously mentioned, descriptive information is maintained for each LAB number and describes aspects and information shared by all LABs assigned to that LAB number.

This information is useful for aggregating statistics about how those LABs are used. For example, in an exemplary system, heap memory may support one or more LABs per collection generation. To allow a dynamic assignment of LABs and generations, each generation specifies a LAB description for each assigned LAB number outlining the range of sizes its LABs may take on, how those LABs may be resized, the range of object sizes that may be allocated in the LAB, and how threads allocating, or refilling, LABs do so from the generation. These per-LAB descriptions are allocated as generations are initialized and may be stored in the LAB descriptor table as discussed above.

In step 606, a determination is made whether the system is currently assigning LABs to processors, or operating in "PLAB mode". This determination can be made by examining the state of a current mode flag. If the system is currently in PLAB mode then, in step 608, a waste limit amount is calculated. The waste limit amount is the maximum amount of wasted memory that will be accepted before a switch is made to assigning LABs to threads ("TLAB mode"). In PLAB mode, the waste limit is calculated by computing the number of threads performing allocation multiplied by the current maximum LAB size, with the number of allocating threads and the current maximum LAB size obtained from statistics gathered in a particular LAB description.

Then, in step 612, the amount of wasted memory obtained from the LAB description information is compared to the limit calculated in step 608. If the wasted memory is greater than the calculated limit, then, in step 616, a switch to TLAB mode is initiated, as described below, and the process finishes in step 620. Alternatively, if the wasted memory is greater than the calculated limit, then, in step 620, the process finishes for the current cycle.

If, in step 606, a determination is made whether the system is currently assigning LABs to threads, or operating in TLAB mode, then, in step 610, a TLAB waste limit amount is calculated. The waste limit amount is the maximum amount of wasted memory that will be accepted before a switch is made to assigning LABs to processors. In TLAB mode, the waste limit is calculated by computing the number of processors performing allocation multiplied by the current maximum LAB size, with the number of allocating processors and the current maximum LAB size obtained from statistics gathered in a particular LAB description.

Then, in step 614, the amount of wasted memory obtained from the LAB description information is compared to the limit calculated in step 610. If the wasted memory is greater than the calculated limit, then, in step 618, a switch to PLAB mode is initiated, as described below, and the process finishes in step 620. Alternatively, if the wasted memory is greater than the calculated limit then, in step 620, the process finishes for the current cycle.

Although the LAB structures used for TLABs and PLABs are identical, due to differences in how the correct LAB is chosen (using the thread structure or CPU ID respectively), and the need to use restartable critical sections in the PLAB case, separate resource utilization functions, in this case, separate functions for allocating space from the LABs, must be used for allocating space for objects from a LAB when operating in TLAB mode or PLAB mode. When a decision is made to switch modes, two types of changes are generally involved so that the correct allocating function is used. In some systems, LAB-based object allocation functions are specified in each class and generation. Specifically, a set of allocation functions are included with each class for use with each generation and another set of more general allocation functions are included with each generation. Part of switching from one allocation mode to another involves patching the allocation tables in the class and generation structures to point to the new mode's allocation function.

Figure 7:
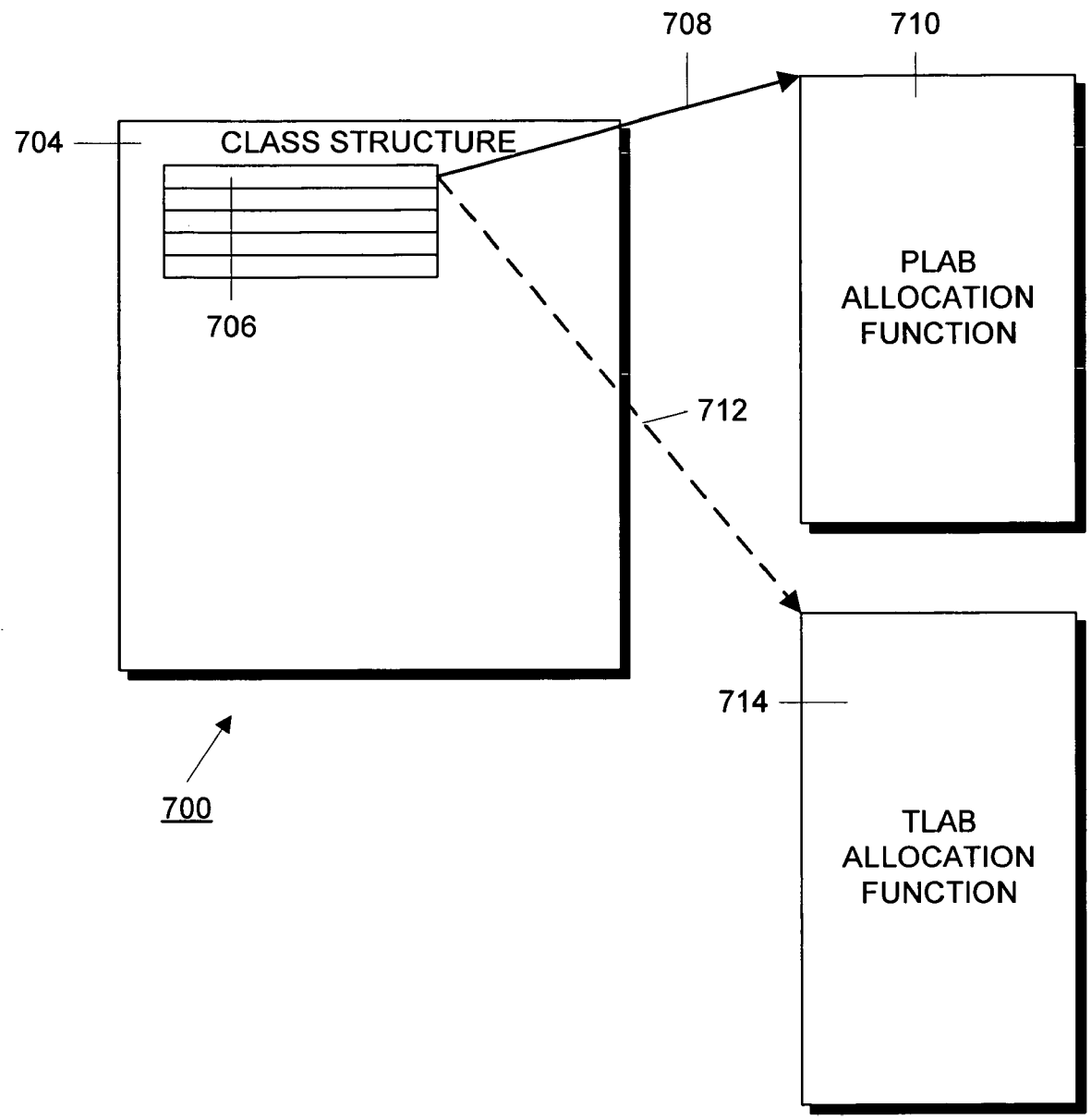
FIG. 7 is a block schematic diagram that illustrates a method for patching a class allocation table to switch between resource utilization code that operates with processor assigned resource pools and resource utilization code that operates with thread assigned resource pools in interpreted code.

In particular, an illustrative class structure 700 is shown in FIG. 7 and includes an allocation table 706. The allocation table 706 contains a list of function addresses that point to a set of allocation functions. The set may contain various functions for allocating in specific sub-heaps (generations). In many cases, when the system needs to allocate an instance of a class, it simply calls the allocation function stored in the proper entry of the class allocation table.

Thus, the entries can be patched with the proper address to point to PLAB allocation functions of which function 711 is shown, as indicated schematically by arrow 708 or to point to TLAB allocation functions, such as function 714 as indicated schematically by arrow 712. Similarly, each generation in a generational collector may have an allocation table used for specific variations of allocation, and may be updated in a similar fashion.

However, in compiled code, the allocation functions may be precompiled based on runtime constants such as LAB description index, object size, and even object characteristics. In this case, all object allocations are done through direct calls to the appropriate allocation functions where the function addresses are retrieved from the appropriate class structures when the code was generated. To ensure that these direct calls for allocation are properly updated, the allocation functions are segregated by the TLAB or PLAB allocation buffers that they employ and then the disabled set of such functions is patched so that they, in turn, patch calling functions redirecting them to the correct corresponding functions in the other set of allocation functions. This approach allows those cases of dynamically-generated code calling into the currently disabled set of allocation functions to lazily adjust themselves to call the correct set.

Figure 8:
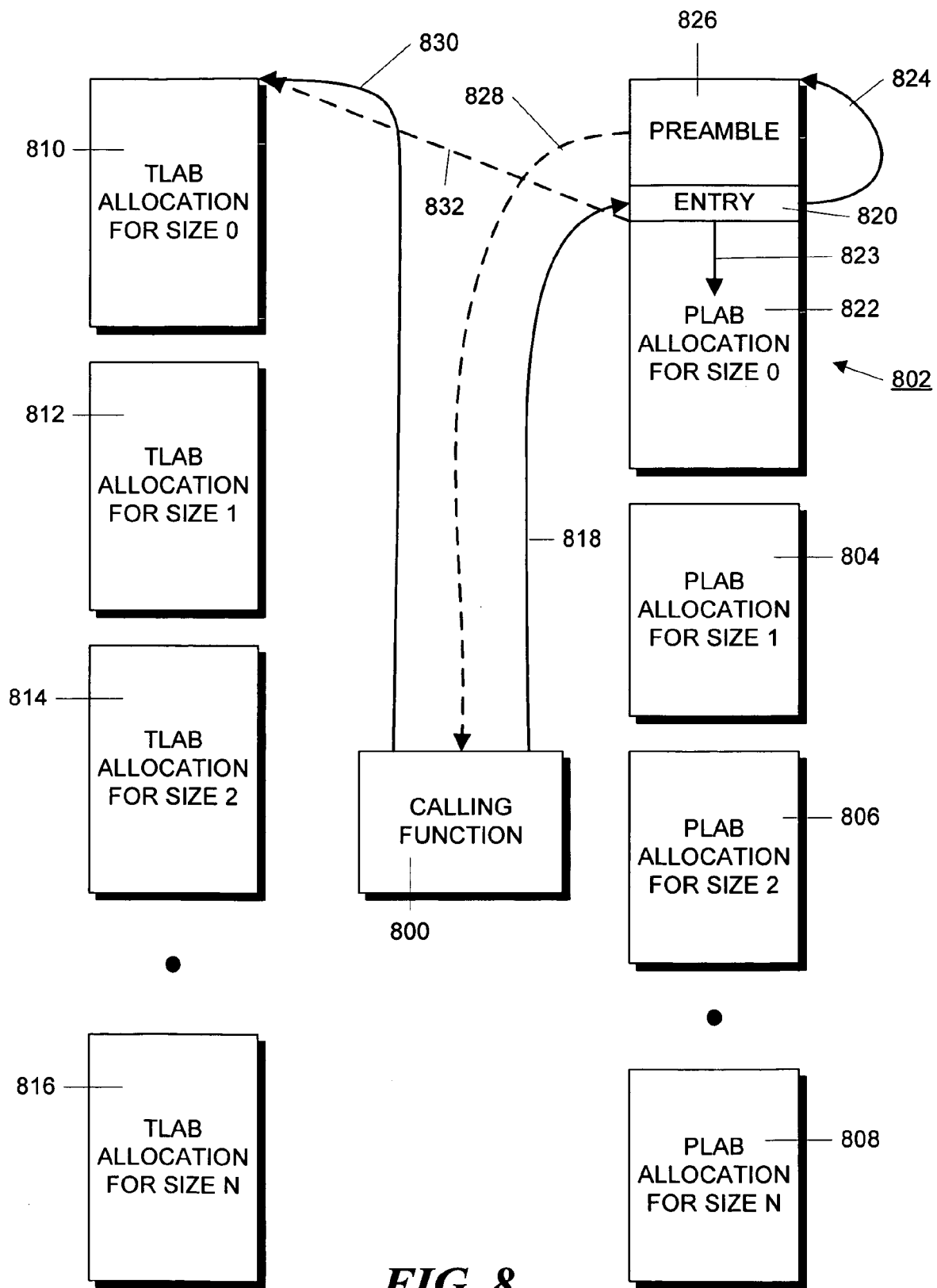
FIG. 8 is a block schematic diagram illustrating how resource utilization code can be dynamically patched to switch between code that operates with processor assigned resource pools and code that operates with thread assigned resource pools in compiled code.

This process is illustrated in FIG. 8. Here a calling function 800 calls into an appropriate one of a set of TLAB allocation functions, of which four, 810-816, are illustrated and a set of PLAB allocation functions, of which four, 802-808, are illustrated. In general, different allocation functions are used for different sized objects. In addition, different allocation functions may be used for different generations, however, these are not shown in FIG. 8.

During normal operation, a calling function 800 would make a call to an entry point 820 in an allocation function, such as PLAB allocation function 802, as indicated schematically by arrow 818. The allocation function 802 then proceeds through the body of the function 822 as indicated schematically by arrow 823 until the end is reached, at which point control returns to the calling function 800.

Assume, for the purposes of illustration, that a decision has been made to switch from PLAB mode to TLAB mode. When this decision is made, the entry points of the PLAB allocation functions 802-808, such as entry point 820, are patched so that, when PLAB function 802 is called, the entry point 820 causes a transfer of control to a function preamble 826 as indicated by arrow 824. The function preamble 826 is precompiled at the same time that the associated function 822 is compiled. The function preamble 826, in turn, patches the calling function 800, as indicated by arrow 828 so that, the next time it calls an allocation function, it will call the corresponding TLAB allocation function 810 as indicated schematically by arrow 830. The preamble then jumps to the corresponding TLAB allocation function 810 as indicated schematically by arrow 832.

Thus, as each PLAB allocation function is called it, will patch the calling function to cause the corresponding TLAB allocation function to be called the next time the calling function calls an allocation function. Thus, the allocation functions will switch from PLAB allocation to TLAB allocation. A mode switch from TLAB allocation to PLAB allocation mode causes a similar lazy transfer back to the PLAB allocation functions. In particular to switch back from TLAB mode to PLAB mode, the TLAB allocation function entry points are patched to cause a jump into the preamble of each function, thereby causing the calling functions to be lazily patched to the PLAB allocation functions. In addition, the PLAB allocation functions are also patched to return them to their normal state in order to prevent them from re-patching the calling function back to the TLAB allocation functions.

Figure 9:
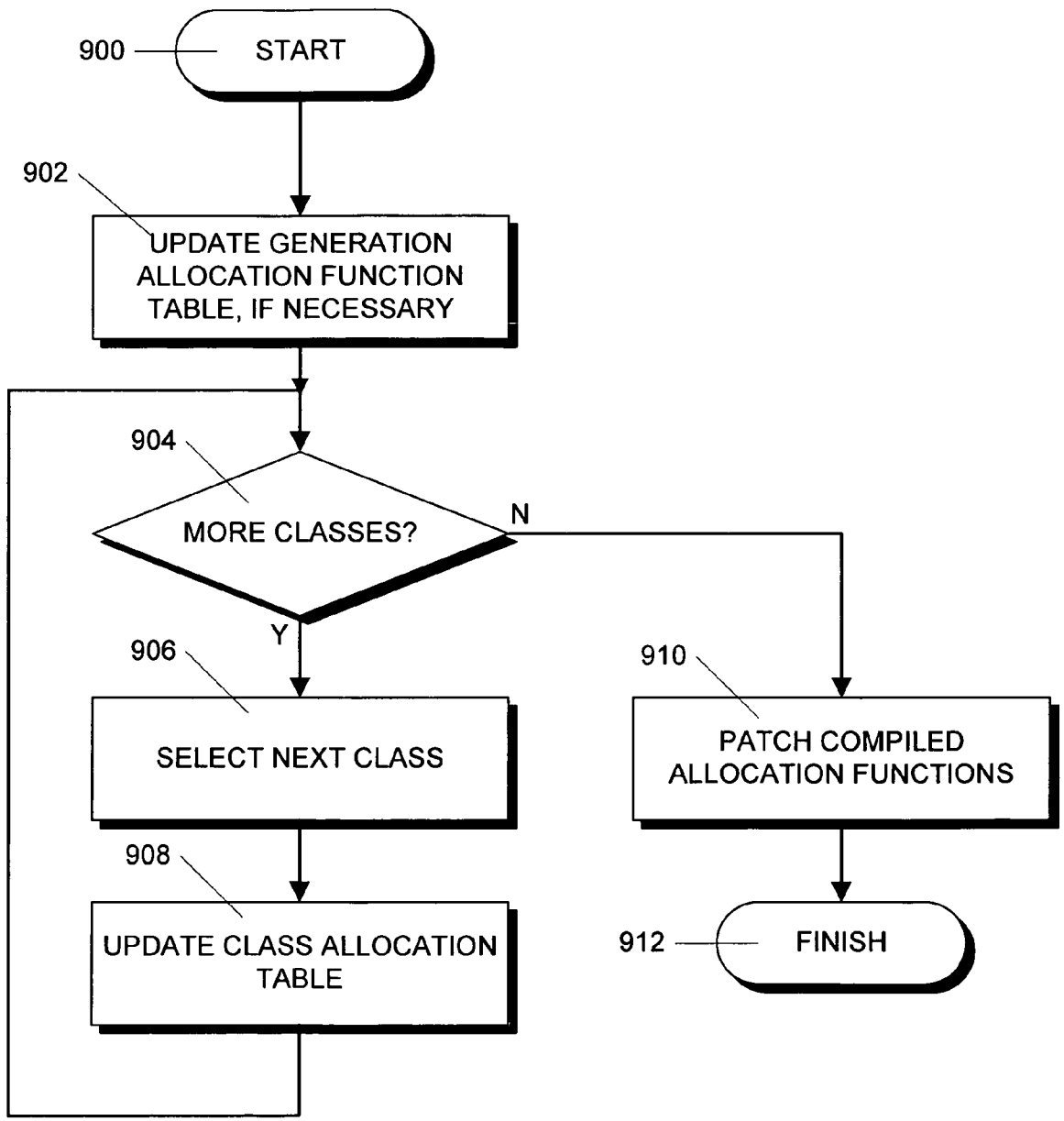
FIG. 9 is a flowchart that shows steps in an illustrative process for switching between resource utilization code that operates with processor assigned resource pools and resource utilization code that operates with thread assigned resource pools based on resource utilization.

With the two transfer mechanisms as described above, the allocation mode switch for a particular LAB number is illustrated in FIG. 9. This process starts in step 900 and proceeds to step 902, where a determination is made whether the generation's general allocation functions for allocating objects should be updated to reflect the switch in mode. This case arises when a generation's general allocation functions always allocate memory from LABs of a particular LAB number and it is this LAB number whose mode is being switched. For example, this case often applies in generations that employ a single kind of LAB. The process then proceeds to step 904 where a determination is made whether additional classes whose allocation functions for this generation employ LABs with the LAB number whose mode is being switched. If so, the process proceeds to step 906 where the next such class to be processed is selected. In step 908, the allocation functions for the generation in the selected class are updated as discussed above with respect to FIG. 7. The process then proceeds back to step 904 to determine whether additional classes remain to be processed.

If, in step 904 it is determined that no further classes for the selected generation and LAB number remain to be processed, then the process continues to step 910 where the compiled allocation functions for the LAB number are patched as set forth in connection with FIG. 8. The process then finishes in step 912.

A software implementation of the above-described embodiment may comprise a series of computer instructions either fixed on a tangible medium, such as a computer readable media, for example, a diskette, a CD-ROM, a ROM memory, or a fixed disk, or transmittable to a computer system, via a modem or other interface device over a medium. The medium either can be a tangible medium, including but not limited to optical or analog communications lines, or may be implemented with wireless techniques, including but not limited to microwave, infrared or other transmission techniques. It may also be the Internet. The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, pre-loaded with a computer system, e.g., on system ROM or fixed disk, or distributed from a server or electronic bulletin board over a network, e.g., the Internet or World Wide Web.

Although an exemplary embodiment of the invention has been disclosed, it will be apparent to those skilled in the art that various changes and modifications can be made which will achieve some of the advantages of the invention without departing from the spirit and scope of the invention. For example, it will be obvious to those. reasonably skilled in the art that, in other implementations, different methods could be used to implement the switch between allocation functions other than those specifically described. In addition, a difference threshold could be used to trigger a switch between allocation modes could be used. In addition, although the described embodiments of are related to pooling memory, the same technique can be extended to other shared resources. The order of the process steps may also be changed without affecting the operation of the invention. Other aspects, such as the specific process flow, as well as other modifications to the inventive concept are intended to be covered by the appended claims.

What is claimed is:

1. A method for dynamically assigning a local allocation buffer to one of a thread and a processor in a garbage-collected computer system, the method comprising:
    (a) during the operation of the computer system, determining that an amount of memory that remains free in the local allocation buffer is greater than a predetermined threshold;
    (b) if the local allocation buffer is currently managed by a thread local allocation buffer manager (LABM) associated with the thread, changing, in response to the determination, a management of the local allocation buffer to a processor LABM associated with the processor; and
    (c) if the local allocation buffer is currently managed by the processor LABM associated with the processor:
        changing, in response to the determination, the management of the local allocation buffer to a thread LABM associated with the thread; and
        switching, in response to the determination, from a per-processor memory allocation function to a per-thread memory allocation function, wherein the switching comprises updating a class allocation table by altering the pre-processor memory allocation function to obtain an altered per-processor memory allocation function, wherein the altered per-processor memory allocation function is configured to call the per-thread memory allocation function.

2. The method of claim 1 wherein steps (a)-(c) are performed periodically.

3. The method of claim 1 wherein the computer system comprises a plurality of processors and wherein the predetermined threshold depends on a number of processors in the plurality of processors.

4. The method of claim 1 wherein the computer system comprises a plurality of threads and wherein the predetermined threshold depends on a number of threads in the plurality of threads.

5. The method of claim 1 further comprising:
    (d) if the local allocation buffer is currently managed by the thread LABM, allocating memory from the local allocation buffer by calling an allocation function that does not use blocking synchronization.

6. The method of claim 1 further comprising:
    (d) if the local allocation buffer is currently managed by the processor LABM, allocating memory from the local allocation buffer by calling an allocation function that uses Multi-processor Restartable Critical Sections.

7. The method of claim 1 wherein step (b) comprises:
(b1) switching, in response to the determination, from a per-thread memory allocation function to a per-processor memory allocation function.

8. The method of claim 7 wherein step (b1) comprises updating per class allocation functions.

9. The method of claim 7 wherein step (b1) comprises altering per-thread allocation functions to obtain altered per-thread allocation functions, wherein the altered per-thread allocation functions are configured to call per-processor allocation functions.

10. A system comprising:
a processor;
a memory;
a mode selector that changes a management of a local allocation buffer to one of a thread local allocation buffer manager (LABM) associated with a thread and a processor LABM associated with the processor, where the local allocation buffer is utilized by means of local allocation buffer utilization code;
a monitor configured to measure a utilization of the local allocation buffer; and
a mode switcher configured to:
switch the mode selector to change the management of the local allocation buffer when the utilization measured by the monitor falls below a predetermined threshold; and
switch, in response to falling below the predetermined threshold, between per-processor local allocation buffer utilization code and per-thread local allocation buffer utilization code, wherein switching between utilization code comprises updating a class allocation table by altering the per-processor local allocation buffer utilization code to call the per-thread local allocation buffer utilization code.

11. The system of claim 10 wherein the monitor periodically measures the utilization of the local allocation buffer and the mode switcher switches the management of the local allocation buffer based on the periodic measurements.

12. The system of claim 11 wherein garbage collection cycles are being performed on the system and the monitor periodically measures the utilization of the local allocation buffer between garbage collection cycles.

13. The system of claim 10 wherein the system comprises a number of threads and a number of processors, wherein the processor is one of the number of processors, and wherein the monitor comprises a mechanism that measures utilization based on an amount of unused local allocation buffers, the number of threads and the number of processors.

14. The system of claim 13 wherein the monitor comprises a mechanism that measures utilization based on a number of threads that have been allocating local allocation buffers since a preceding measurement made by the monitor.

15. The system of claim 13 wherein an application is running on the system and wherein the number of threads and the number of processors used to measure utilization are predetermined when the application starts running.

16. The system of claim 13 wherein the number of threads and the number of processors used to measure utilization are determined at the time of measurement.

17. The system of claim 10 wherein the computer system comprises a number of threads and a number of processors and wherein the predetermined threshold is a ratio between the number of threads and the number of processors.

18. The system of claim 10 wherein the predetermined threshold is based on an amount of local allocation buffers which are not currently managed and that could be managed by the one of the thread LABM and the processor LABM.

19. The system of claim 18 wherein the predetermined threshold is based on a maximum amount of the local allocation buffers which are not currently managed and that could be managed by the one of the thread LABM and the processor LABM.

20. The system of claim 10 wherein altering the per-processor local allocation buffer utilization code is carried out when a call is made to the per-processor local allocation buffer utilization code.

21. The system of claim 10 wherein the mode switcher comprises a mechanism that switches between per-processor local allocation buffer utilization code and per-thread local allocation buffer utilization code by updating interpreted code.

22. A non-transitory computer readable storage medium comprising software instructions, which, when executed by a first processor perform a method, the method comprising:
during the operation of a computer system, determining that an amount of memory that remains free in the local allocation buffer is greater than a predetermined threshold;
if the local allocation buffer is currently managed by a thread local allocation buffer manager (LABM) associated with a thread, changing, in response to the determination, a management of the local allocation buffer to a processor LABM associated with a second processor; and
if the local allocation buffer is currently managed by a processor LABM associated with the second processor:
changing the management of the local allocation buffer to a thread LABM associated with the thread; and
switching, in response to the determination, from a per-processor memory allocation function to a per-thread memory allocation function, wherein the switching comprises updating a class allocation table by altering the processor memory allocation function to obtain an altered per-processor memory allocation function, wherein the altered per-processor memory allocation function is configured to call the per-thread memory allocation function.

23. The computer readable storage medium of claim 22 wherein the amount of memory that remains free in the local allocation buffer is measured periodically.

24. The computer readable storage medium of claim 22 wherein the computer system comprises a plurality of processors and wherein the predetermined threshold depends on a number of processors in the plurality of processors.

25. The computer readable storage medium of claim 22 wherein the computer system comprises a plurality of threads and wherein the predetermined threshold depends on a number of threads in the plurality of threads.

* * * * *

UNITED STATES PATENT AND TRADEMARK OFFICE
CERTIFICATE OF CORRECTION

| | | |
|---|---|---|
| PATENT NO. | : 7,882,505 B2 | |
| APPLICATION NO. | : 11/090398 | |
| DATED | : February 1, 2011 | |
| INVENTOR(S) | : Alexander Garthwaite et al. | |

It is certified that error appears in the above-identified patent and that said Letters Patent is hereby corrected as shown below:

In Claim 1, Column 10 (line 42), "pre-processor" should read --per-processor--.

In Claim 22, Column 12 (line 44), "processor" should read --per-processor--.

Signed and Sealed this
Fifth Day of April, 2011

David J. Kappos
*Director of the United States Patent and Trademark Office*